United States Patent [19]

Drexler et al.

[11] Patent Number: 4,745,484
[45] Date of Patent: May 17, 1988

[54] METHOD AND APPARATUS FOR STEPPED IMAGING IN READING DATA

[75] Inventors: Jerome Drexler; Joseph B. Arnold, both of Los Altos, Calif.

[73] Assignee: Drexler Technology Corporation, Mountain View, Calif.

[21] Appl. No.: 892,221

[22] Filed: Jul. 30, 1986

[51] Int. Cl.[4] .......................... H04N 5/232; H04N 3/14
[52] U.S. Cl. .................. 358/227; 358/213.13
[58] Field of Search ............. 358/227, 213.28, 213.13, 358/213.11

[56] References Cited

U.S. PATENT DOCUMENTS

| | | | |
|---|---|---|---|
| 3,617,633 | 11/1971 | Barr | 358/227 |
| 4,096,992 | 6/1978 | Nojiri et al. | 235/462 |
| 4,292,511 | 9/1981 | Heyman et al. | 235/454 |
| 4,354,204 | 10/1982 | Kimura | 358/227 |
| 4,370,038 | 1/1983 | Kimura | 358/227 |
| 4,404,594 | 9/1983 | Hannan | 358/227 |
| 4,409,469 | 10/1983 | Yasuda et al. | 235/463 |
| 4,484,806 | 11/1984 | Onishi et al. | 358/227 |
| 4,581,649 | 4/1986 | Morokawa | 358/213.28 |
| 4,582,985 | 4/1986 | Löfberg | 235/380 |
| 4,588,261 | 5/1986 | Erhardt | 350/167 |

FOREIGN PATENT DOCUMENTS 58-13075(A) 1/1983 Japan ................................. 358/227

*Primary Examiner*—Jin F. Ng
*Assistant Examiner*—Stephen Brinich

[57] ABSTRACT

A method and apparatus for reading data in a data field on a data surface of a storage medium in which the data surface may be nonplanar and depthwise regions of the data field are brought one-by-one into the region of focus of a CCD area array. A set of partial images are formed which are then merged together into a composite image of the data field to be read. The storage medium is disposed on a vacuum chuck. Imaging optics, such as a single lens, zoom lens or lenticular array images regions of the data surface which are within a region of focusing onto the CCD area array. A piezoelectric device or a linear variable differential transformer serve as a Z-axis focussing element which responds to oscillator or electrical control signals to change the relative distance between the CCD area array and a reference plane of the data surface. The partial images formed are either merged in semiconductor memory by a processor or are merged automatically by the CCD area array.

11 Claims, 2 Drawing Sheets

METHOD AND APPARATUS FOR STEPPED IMAGING IN READING DATA

DESCRIPTION

1. Technical Field

The present invention relates to methods and optical apparatus for reading data patterns on surfaces with optical detector arrays and in particular to methods and apparatus using CCD area arrays.

2. Background Art

In optical data storage, micron size and larger pits, spots or other marks representing data bits are melted, ablated, embossed or otherwise marked on the surface of an optical data storage medium. The data may then be read with a photodiode detector or linear CCD array which image data spots illuminated by a laser or light emitting diode (LED) light beam or other illuminating source. Usually either the emitting beam or the data storage medium is moved relative to the other so that the data, typically stored in tracks, may be scanned.

Frequently, data spots are stored at uneven depth over the surface of the medium relative to a focal plane of the optical detection system of a reader. A major cause of this unevenness is that the data surface often has minor tilts, warps or bends, relative to an ideal or "target" surface parallel to the focal plane, despite the best efforts to maintain a planar or uniformly curved surface. An ensuing problem is that some data spots are out of the target plane resulting in errors in reading the data. The problem of focal errors has been solved in the prior art by various auto-focus mechanisms, usually servo controlled. These devices usually control the position of a lens to bring a data spot into sharp focus at the detector.

Recently, CCD manufacturing technology has improved and large CCD area arrays have become available which can simultaneously image correspondingly large fields. Current application is to developing filmless cameras in the field of electronic photography in which imaging errors by individual cells of the array is not critical compared to the number of cells in the array. If CCD area arrays were to be applied to reading large data fields, as on labels and data cards, mechanically scanning of data could be eliminated resulting in a faster, cheaper, more compact and more durable reader. Further, servo tracking of data stored in tracks could be eliminated with a possible increase in data storage density.

Unfortunately, focal errors over large surfaces can no longer be corrected by moving a single lens because there are so many different focal errors over the area of a label or card. Minor tilts, warps or bends in the surface of a storage medium cause many data spots to be out of focus regardless of the location of the focal plane of the detector.

Accordingly, it is an object of the present invention to devise a method and apparatus for reading fields of data where there are warps, bends and in general, unevenness in the surface of the label, card or like medium where data fields exist.

DISCLOSURE OF THE INVENTION

The above object has been met with a method of reading data at different elevations relative to an ideal target plane. This is accomplished by changing the Z-axis or depthwise separation between a storage medium and a CCD area array thereby bringing various out-of-focus areas one by one into the focal plane of the detector array. A set of in-focus, depthwise, partial images are formed which are then optically integrated or merged together to form the complete composite image. In the preferred embodiment, this merging is done automatically by the detectors themselves. Alternatively, the partial images may be merged by computer processing. Using this method, the data spots on almost any surface without abrupt discontinuities may be read with a CCD area array.

The optical apparatus for reading the data field on a data surface has a planar CCD area array and a chuck or the like for holding the data surface spaced apart from and generally parallel to the array. A lens or a lenticular array located between the CCD area array and the data surface images regions of the data surfaces within a region of focus around a focal plane onto the CCD area array. A piezoelectric element or a linear variable differential transformer may be used to make slight changes in the relative distance between the CCD area array and a reference plane of the data surface, such as by vibration or by incremental steps, and thereby bring further regions one by one into focus. The changes in relative distance may be performed as slow incremental steps separated by an amount approximately equal to the depth of focus of the optical detection system so that the partial images can be added together in a semiconductor memory with a processor. Alternatively, the response time of the CCD area array may be sufficiently slow compared to a rate of vibration that a composite image is automatically formed by the array.

BEST MODE OF CARRYING OUT THE INVENTION

Figure 1:
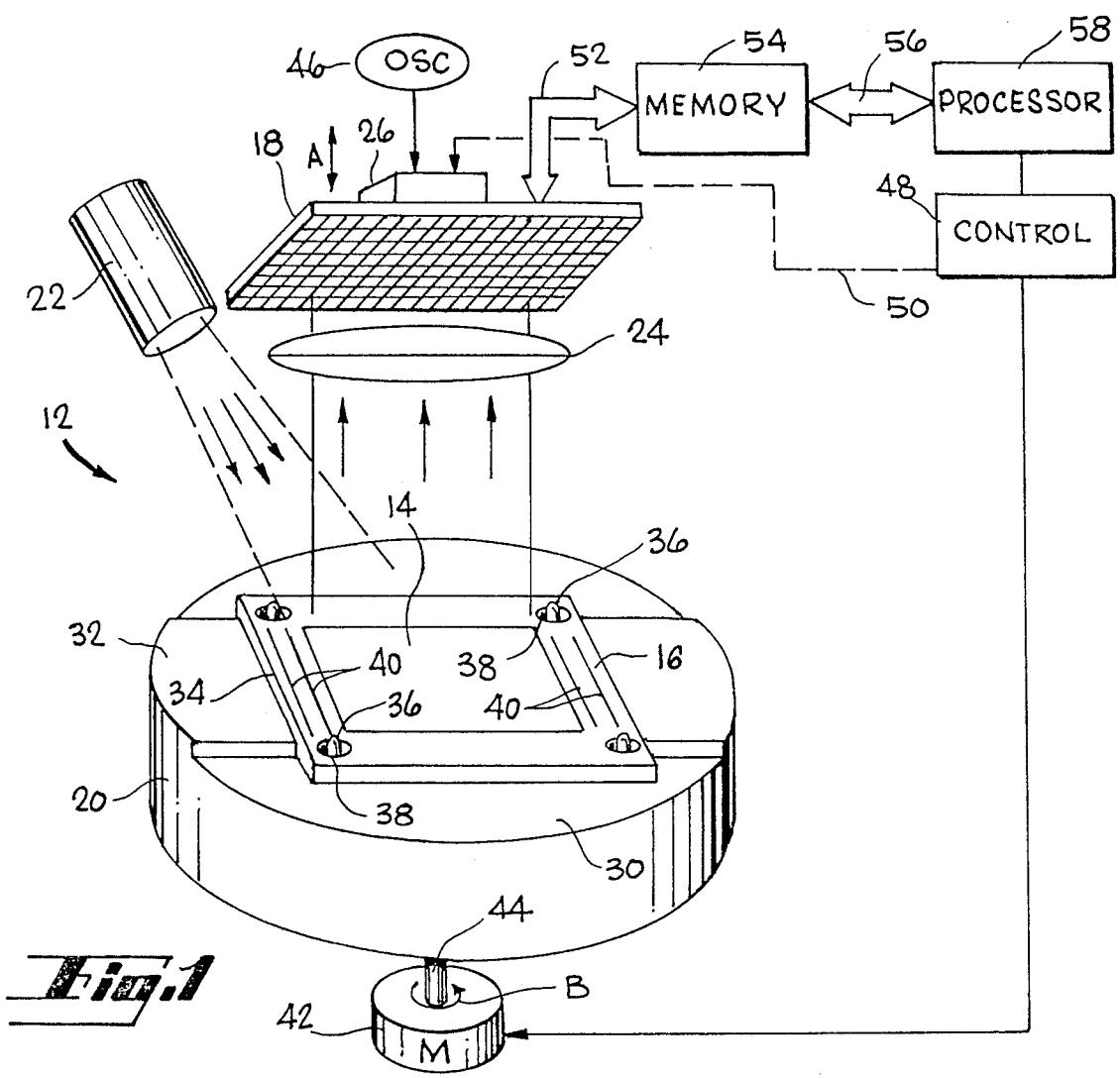
FIG. 1 is a perspective view of an optical apparatus of the present invention reading data on a label.

With reference to FIG. 1, an optical apparatus 12 is provided for reading data in a data field 14 on a data surface of storage medium 16. Storage medium 16 is typically a label or a card and may have mild warps, bends and, in general, an unevenness in the data surface. In other words, medium 16 need not be perfectly planar or flat. Optical apparatus 12 comprises a CCD area array 18, vacuum chuck 20 for holding medium 16, a light source 22, imaging optics represented by lens 24 and an element 26 for changing the relative distance between CCD area array 18 and a reference plane 30 of the data surface of medium 16.

CCD area array 18 is a semiconductor chip with a light sensitive grid made up of a plurality of photodiodes, phototransistors or other light sensitive picture elements coupled together. CCD area arrays are known and a 360,000 element array produced by Sony Corp. is a typical CCD area array which may be used with this invention. Imaging optics represented by lens 24 may be a single lens, or alternatively may be a lenticular array. Lenticular arrays are known and are exemplified by the imager in U.S. Pat. No. 4,588,261 to Erhardt. The optical apparatus may also have a zoom lens arrangement, i.e. imaging optics with variable magnification, so as to read different size labels.

Vacuum chuck 20 holds storage medium 16 in a data reading position which is spaced apart from and generally parallel to CCD area array 18. Medium 16 sits on the top surface 30 of vacuum chuck 20. Top surface 30 defines a reference plane for the data surface of medium 16. In order to ensure the proper positioning and orientation of the data field with respect to CCD area array 18, vacuum chuck 20 may include one or more feet 32 on top surface 30 having rims 34 that capture an edge or edges of medium 16. The vacuum chuck 20 may also have a plurality of small projections 36 from top surface 30 which mate with small holes 38 punched in medium 16. Vacuum chuck 20 may include a motor 42 which turns chuck 20 about a shaft 44 as indicated by arrow B. Motor 42 combines with data alignment marks 40 on storage medium 16 to correct for skew between data field 14 and CCD area array 18, by turning chuck 20 until the marks 40 are recognized by optical apparatus 12. Vacuum chuck 20 may have one or more of these positioning devices, other like devices, or apparatus 12 may use software techniques to manipulate the images detected by CCD area array 18 in memory until the data is properly aligned.

Optical apparatus 12 includes an element 26 for changing the distance between CCD area array 18 and reference plane 30, which as noted above is the top surface of chuck 20 holding storage medium 16. In other words, element 26 is a focussing element that changes the relative distance between array 18 and data field 14 containing data, thereby bringing various regions of the data surface into and out of focus with respect to array 18. Typically, focusing element 26 is a piezoelectric device or a linear variable differential transformer connected to CCD area array 18. Alternatively, focusing element 26 may be connected to imaging optics 24 or to the back storage medium 16 on vacuum chuck 20.

In the preferred embodiment, focussing element 26 receives an electrical signal from an oscillator 46 so as to produce distance changes between array 18 and reference plane 30 by way of vibration. The vibration is characterized by a period which should be substantially less than the detector time. The vibration is also characterized by an amplitude which should be able to bring all regions of data field 14 into focus.

Alternatively, focussing element 26 may receive an electrical signal from a control circuit 48 via a line 50 shown in phantom so as to produce distance changes which are slow incremental steps. The rate at which the incremental steps are performed should be at least as slow as the response time of the CCD area array 18. Further, the changes in relative distance should be approximately equal to a depth of focus of CCD area array 18.

Figure 2:
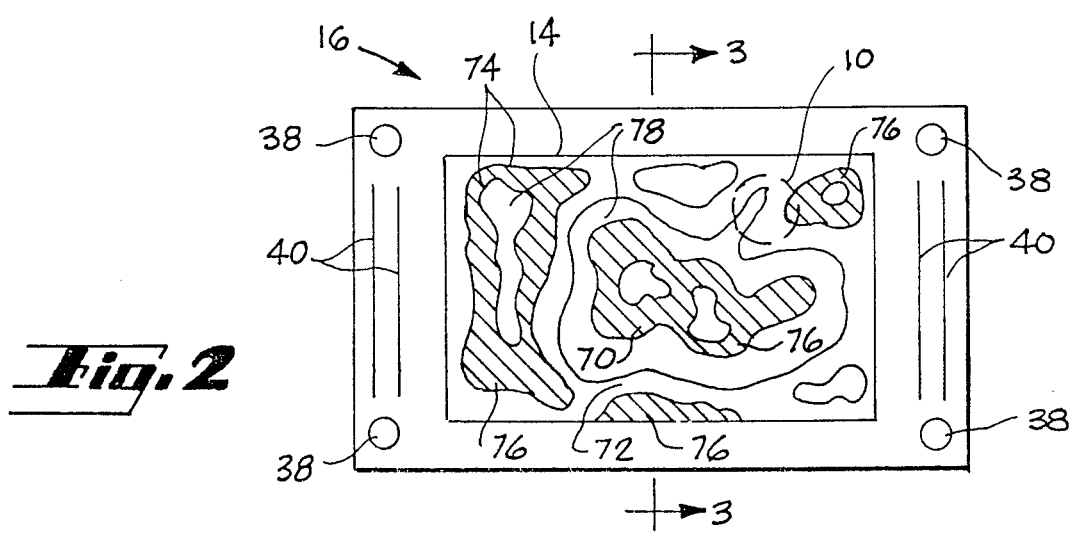
FIG. 2 is a top plan of the label in FIG. 1 illustrating the method of the present invention.
Figure 2A:
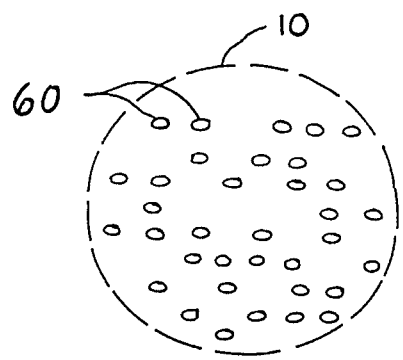
FIG. 2a is an enlarged view of a portion of the label in FIG. 2 showing data spots.

In FIG. 2, a storage medium 16 such as a label or card, has a data field 14 containing data, punched holes 38 and data alignment marks 40 for proper positioning and orientation, as described above. An area of data field 14 delimited by dashed circle 10 and enlarged in FIG. 2a shows that data is stored as micron size or larger pits, spots or other marks representing data bits.

The data spots 60 have a reflectivity which contrasts with unrecorded areas of the surrounding field. Preferably, data spots have a reflectivity of less than 10%, while the surrounding field has a reflectivity of about 50%, thus creating a contrast ratio of at least five to one. A contrast ratio of at least two to one is sufficient contrast for reading. Alternatively, data spots may have greater reflectivity than the surrounding field. Data spots 60 may be circular or oblong in shape and are preferably arranged in a matrix of spaced apart rows and columns. The separation between data spots in the rows and columns need not be equal, and, for maximum data density, the matrix of rows and columns should have an aspect ratio which equals that of the CCD area array. The maximum data spot size is determined by the size of the data field and the number of elements in the CCD area array. Preferably, the data spots are less than 25 microns in size and spaced less than 25 microns apart. Preferably, sixteen picture elements in a four-by-four cell area of the CCD area array read each data spot. For a single 360,000 element CCD area array, data field 14 may typically be 9 mm wide by 6 mm high and may contain about 22,000 data spots. Other size data fields and data spots may also be used. Additional CCD area arrays may also be provided adjacent to array 18 for reading larger data fields.

Figure 3:
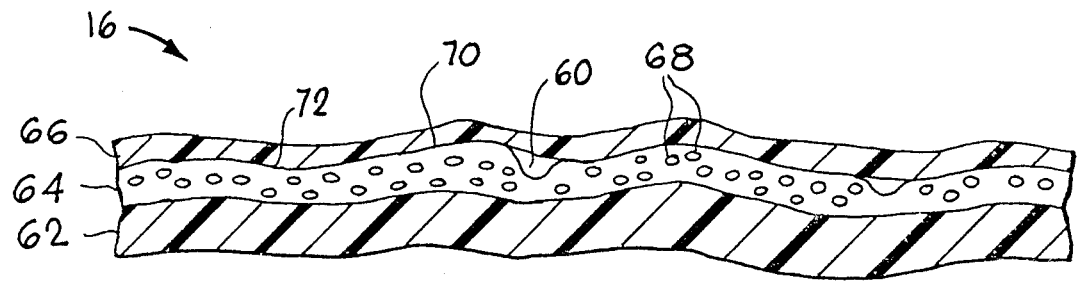
FIG. 3 is a side sectional view of the label taken along the line 3—3 in FIG. 2.

With reference to FIGS. 2 and 3, storage medium 16 has an uneven surface. Typically, a storage medium such as a label has a substrate 62, such as a cellulose acetate polyester film base, polycarbonate, or an Aclar moisture barrier material (Aclar is a trademark of Allied Chemical), on which a recording layer 64 is disposed. A similar transparent protective layer 66 is provided over recording layer 64. Recording layer 64 may be any of the recording materials developed for optical data storage such as that disclosed in U.S. Pat. No. 4,284,716 to Drexler et al. and assigned to the assignee of the present invention. Such a recording layer is composed of reflective metal particles 68 in a colloid matrix. Data spots 60 are typically laser recorded producing spots which are pits in the recording layer. Other optical data storage materials may also be used.

In any case, the data surface, i.e. the top surface of recording layer 64 is nonplanar and has peaks 70 and valleys 72 relative to a reference plane. In FIG. 2, the unevenness of the data surface is illustrated by means of contour lines 74. Contour lines represent all points of equal height relative to the reference plane. The CCD area array 18 in FIG. 1 has a focal plane and a region of focus around the focal plane characterized by a depth of focus. In FIG. 2, the contour lines represent heights which are an integral number of depths of focus apart. Thus, the contour lines delimit regions on the data surface, such as regions 76 indicated by the diagonal hatching, which lie within a region of focus.

In operation, referring to FIGS. 1 and 2, a data storage medium 16 is disposed in a position spaced apart from and generally parallel to CCD area array 18. Light source 22, illuminates data field 14 and imaging optics 24 images first regions 76 of the data field onto CCD area array 18. The particular regions imaged are those which lie within the region of focus of array 18. All other regions are out-of-focus and are consequently not imaged. Thus, a first partial image of data field 14 is formed.

The partial image is stored in a memory 54, typically a semiconductor memory, which communicates with array 18 via a bus line 52. Next, the relative distance between the CCD area array 18 and reference plane 30 is changed by applying an electrical signal to focussing element 26. When the distance has changed by one depth of focus, second regions 78 of the data surface are brought into the region of focus and imaged onto array 18, while first regions 76 are now out-of-focus, thereby forming a second partial image of data field 14. This second partial image is also stored in memory 54.

The steps of changing the relative distance between CCD area array 18 and reference plane 30 is repeated to bring other regions into the region of focus until partial images have been obtained for the entire data field 14. A composite image is then formed from all of the partial images. This composite image may be formed, for example, by a processor 58 communicating with memory 54 via bus line 56. Alternatively, if changing the distance between array 18 and reference plane 30 occurs by vibration of array 18 with a vibration period substantially less than the response time of CCD area array then the composite image is formed automatically by the array provided the amplitude of vibration is large enough to bring all regions of data field 14 into the region of focus of array 18. The composite image is stored in memory 54. The composite image is that of the complete data field which can then be read by processor 58.

We claim:

1. A method of optically reading data in a data field on a data surface using a CCD area array comprising,
   disposing a data medium with a data field on a data surface thereof in a position spaced apart from and generally parallel to a CCD area array, said CCD area array having a focal plane and a depthwise region of focus around said focal plane,
   imaging regions of said data surface within said depthwise region of focus onto said CCD area array to form a partial image of the data surface,
   vibrating one of said CCD area array and said data surface in a direction normal to a reference plane of said data surface to change the relative depthwise distance between said CCD area array and said reference plane in order to bring second depthwise regions of the data surface into said region of focus, said vibrations having a characteristic vibration period, said CCD area array being characterized by a response time which is substantially longer than said vibration period,
   imaging said second regions onto said CCD area array to form a second partial image of the data surface,
   repeating the two previous steps for other regions of said data surface until partial images have been obtained for all of said data surface, and
   forming a composite image from all of said partial images to read the data field.

2. The method of claim 1 wherein said reference plane is parallel to said planar CCD area array.

3. The method of claim 1 wherein said data field is made up of data spots representing data bits in a matrix of areawise regions on said data surface.

4. The method of claim 3 wherein said CCD area array is made up of a plurality of detector cells, each of said areawise regions being imaged onto an equal number of detector cells.

5. A method of optically reading data in a data field on a data surface using a CCD area array comprising,
   disposing a data medium with a data field on a data surface thereof in a position spaced apart from and generally parallel to a CCD area array, said CCD area array having a focal plane and a depthwise region of focus around said focal plane,
   imaging regions of said data surface within said depthwise region of focus onto said CCD area array to form a partial image of the data surface,
   changing the relative depthwise distance between said CCD area array and a reference plane of said data surface to bring second depthwise regions of the data surface into said region of focus, said region of focus characterized by a depth of focus, changing said relative distance being accomplished by incrementing said distance between said CCD area array and said reference plane by an amount substantially equal to said depth of focus,
   imaging said second regions onto said CCD area array to form a second partial image of the data surface,
   repeating the two previous steps for other regions of said data surface until partial images have been obtained for all of said data surface, and
   forming a composite image from all of said partial images to read the data field.

6. An optical apparatus for reading data in a data field on a data surface using a CCD area array comprising,
   a planar CCD area array having a focal plane and a depthwise region of focus around said focal plane,
   means for holding a data surface with a data field spaced apart from and generally parallel to said CCD area array,
   means for imaging regions of said data surface within said depthwise region of focus onto said CCD area array, thereby forming a partial image of the data surface,
   means for changing the relative depthwise distance between said CCD area array and a reference plane of said data surface, thereby forming further partial images of the data surface, said means for changing the relative distance vibrating one of said CCD area array and said data surface in a direction normal to said focal plane with a characteristic vibration period, said CCD area array characterized by a response time which is substantially longer than said vibration period, and
   means for forming a composite image of the data field from all of the partial images.

7. The optical apparatus of claim 6 wherien said data field is made up of data spots on said data surface representing data bits, said CCD area array being made up of a plurality of detector cells, the optical apparatus further comprising means for aligning said data spots on said data surface with said detector cells of said CCD area array.

8. The optical apparatus of claim 6 wherein said means for changing the relative distance is a piezoelectric element.

9. The optical apparatus of claim 6 wherein said means for changing the relative distance is a linear variable differential transformer.

10. The optical apparatus of claim 6 further comprising means for storing said partial images.

11. An optical apparatus for reading data in a data field on a data surface using a CCD area array comprising,
    a planar CCD area array having a focal plane and a depthwise region of focus around said focal plane,
    means for holding a data surface with a data field spaced apart from said generally parallel to said CCD area array,
    means for imaging regions of said data surface within said depthwise region of focus onto said CCD area array, thereby forming a partial image of the data surface, means for changing the relative depthwise distance between said CCD area array and a reference plane of said data surface, thereby forming further partial images of the data surface, said depthwise region of focus characterized by a depth of focus, said means for changing the relative distance moving one of said CCD area array and said data surface by successive incremental distances substantially equal to said depth of focus, and means for forming a composite image of the data field from all of the partial images.

* * * * *

UNITED STATES PATENT AND TRADEMARK OFFICE
CERTIFICATE OF CORRECTION

PATENT NO. : 4,745,484

DATED : May 17, 1988

INVENTOR(S) : Jerome Drexler et al.

It is certified that error appears in the above—identified patent and that said Letters Patent is hereby corrected as shown below:

Claim 11, column 6, line 65, "apart from said generally parallel to" should read - -apart from and generally parallel to- -.

Signed and Sealed this

Seventh Day of March, 1989

Attest:

DONALD J. QUIGG

Attesting Officer

Commissioner of Patents and Trademarks